United States Patent
Milne et al.

(10) Patent No.: US 11,658,942 B2
(45) Date of Patent: *May 23, 2023

(54) MAINTAINING SECURITY IN DIGITAL ELECTRONIC TRANSFERS THROUGH USE OF A LABEL TRACKING SYSTEM

(71) Applicant: Dwolla, Inc., Des Moines, IA (US)

(72) Inventors: Benjamin P. Milne, Des Moines, IA (US); Adrienne Sum, San Francisco, CA (US)

(73) Assignee: DWOLLA, INC., Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,428

(22) Filed: Mar. 14, 2022

(65) Prior Publication Data
US 2022/0210134 A1 Jun. 30, 2022

Related U.S. Application Data

(63) Continuation of application No. 16/354,055, filed on Mar. 14, 2019, now Pat. No. 11,277,386.

(51) Int. Cl.
*H04L 9/40* (2022.01)
*G06F 21/62* (2013.01)

(52) U.S. Cl.
CPC ...... *H04L 63/0421* (2013.01); *G06F 21/6245* (2013.01)

(58) Field of Classification Search
CPC ............ H04L 63/0421; G06F 21/6245; G06Q 20/383; G06Q 20/385
See application file for complete search history.

(56) References Cited

U.S. PATENT DOCUMENTS 6,108,641 A * 8/2000 Kenna ................. G06Q 20/405
705/2
2003/0009402 A1 1/2003 Mullen et al.
(Continued)

OTHER PUBLICATIONS

Milne, U.S. Appl. No. 16/354,055, filed Mar. 14, 2019, Notice of Allowance and Fees Due, dated Nov. 2, 2021.
(Continued)

*Primary Examiner* — Kenneth W Chang
(74) *Attorney, Agent, or Firm* — Hickman Becker Bingham Ledesma LLP

(57) ABSTRACT

Systems and method for method for increasing security in online transfers by maintaining anonymity of transferors are described herein. In an embodiment, a label tracking system receives a request to generate labels for an account of an account holder. The system generates a plurality of labels in response to the request and send the plurality of labels to an account computing device which stores a mapping of labels to identification information. The system receives an allocation request from the account computing device and stores allocations for each of the generated labels. When the system receives a request to perform a transfer between two labels, without changing any items within the account and without receiving identification information corresponding to the labels, the system updates the labels by decrementing an amount allocated to the transferor label and incrementing an amount allocated to the transferee label.

12 Claims, 4 Drawing Sheets

(56) References Cited

U.S. PATENT DOCUMENTS

| | | | |
|---|---|---|---|
| 2003/0080185 A1* | 5/2003 | Werther | G07F 19/203 |
| | | | 235/380 |
| 2009/0144193 A1* | 6/2009 | Giordano | G06Q 20/40 |
| | | | 705/39 |
| 2010/0063939 A1* | 3/2010 | Call | G06Q 40/06 |
| | | | 705/36 R |
| 2010/0064017 A1* | 3/2010 | Buchheit | H04L 51/216 |
| | | | 709/206 |
| 2011/0010254 A1 | 1/2011 | Chenot | |
| 2011/0213684 A1 | 9/2011 | Tait | |
| 2013/0238489 A1* | 9/2013 | Bouey | G06Q 20/10 |
| | | | 705/39 |
| 2017/0169507 A1* | 6/2017 | Skaarup | G06Q 40/02 |

OTHER PUBLICATIONS

Milne, U.S. Appl. No. 16/354,055, filed Mar. 14, 2019, Non-Final Rejection, dated Jun. 17, 2021.

* cited by examiner

MAINTAINING SECURITY IN DIGITAL ELECTRONIC TRANSFERS THROUGH USE OF A LABEL TRACKING SYSTEM

CROSS-REFERENCE TO RELATED APPLICATIONS, BENEFIT CLAIM

This application claims the benefit as a Continuation of application Ser. No. 16/354,055, filed Mar. 14, 2019 the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application.

FIELD OF THE DISCLOSURE

The present disclosure relates to maintaining security and anonymity in digital electronic transfers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Security in digital electronic transfer systems is a huge problem modernly. Many digitally banking systems act as a single point in failure. They store personal information of account holders, balances of each account, and data required to perform transfers from the accounts. Thus, a single breach of security into a system would allow a user to access an account, determine how much is capable of being spent from the account, and initiate a transfer from the account.

Modern banking systems can also be difficult to use for managing and transferring funds. For instance, if a parent wishes to be able to transfer funds to a college student, the parent would either need to set up two separate banking accounts, set up a banking account the child has access to, or transfer funds directly to a child's account. The latter option is unavailable if the child is not old enough to have a banking account in his or her name. The first two options each have their own issues. In both, a transfer between accounts is time consuming. Additionally, a shared account grants unfettered access to both parties, thereby limiting its usefulness when certain expenditures of funds would exceed the purpose of the transfer.

Thus, there is a need for a system which provides security by maintaining anonymity during transfers, thereby separating transfer information from account information. Additionally, there is a need for a system which provides instantaneous transfers that can also be limited or controlled by an account holder.

SUMMARY

The appended claims may serve as a summary of the disclosure.

DETAILED DESCRIPTION

Figure 1:
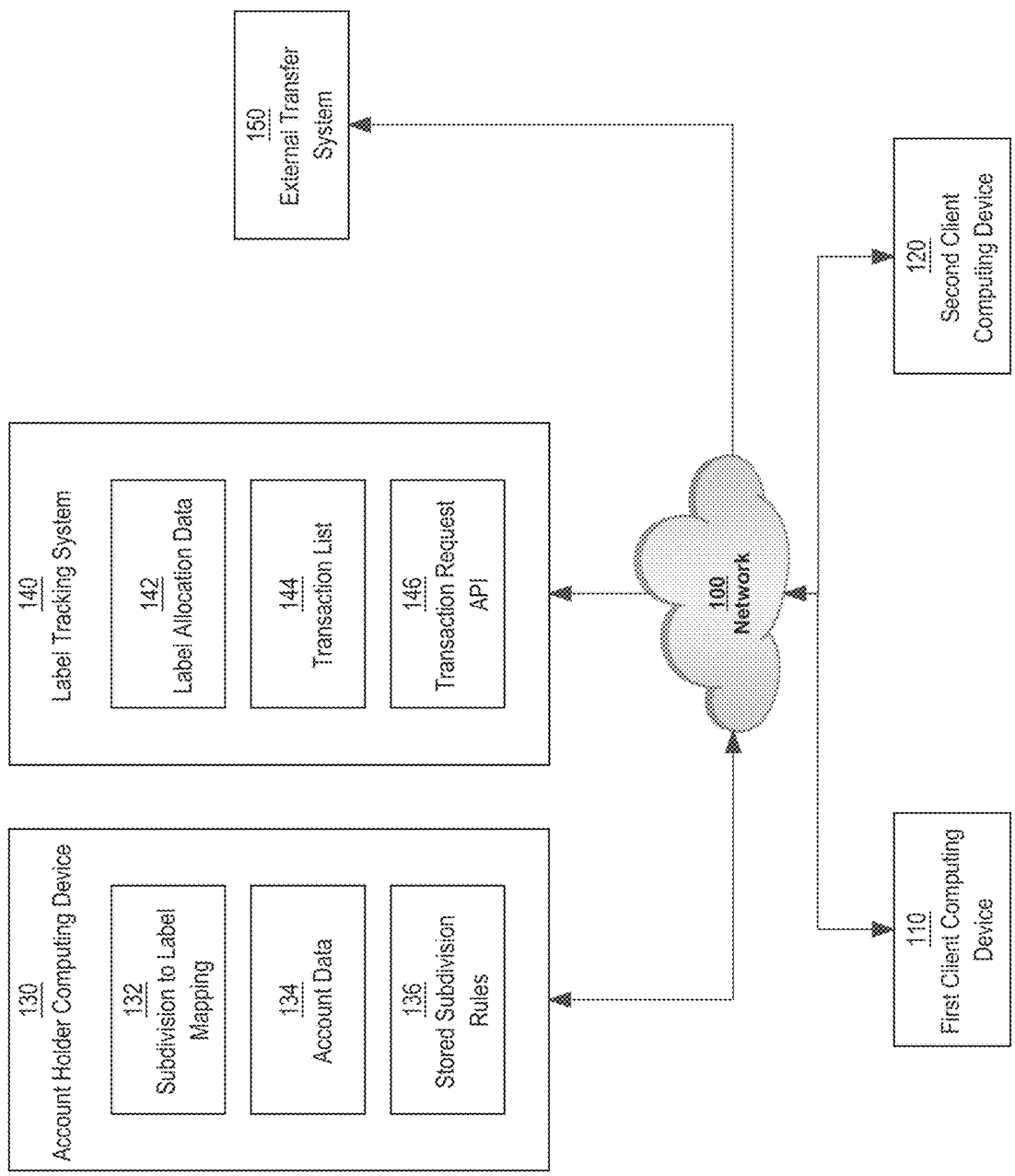
FIG. 1 depicts an example system on which example embodiments may be performed.

In the following description, for the purposes of explanation, numerous specific details are set forth in order to provide a thorough understanding of the disclosure. It will be apparent, however, that embodiments may be practiced without these specific details. In other instances, well-known structures and devices are shown in block diagram form in order to avoid unnecessarily obscuring the present disclosure.

General Overview

Systems and methods for increasing security in online transfers by maintaining anonymity of the transferors is described herein. In an embodiment, a label tracking system stores a plurality of labels, unique identifiers, and data defining allocations to those labels. An account holder computing device which manages an account stores a mapping of the labels to identifying information for the account and for subdivisions of the account. When a request is received to perform a transfer between subdivisions, the account holder computing device identifies the labels that correspond to those subdivisions and sends a request to the label tracking system to perform a transfer between the identified labels. The label tracking system updates the balance of the individual labels and stores the updated balance. Thus, balances for individual labels are stored and updated at a separate system while the account holder stores the sensitive account information and a mapping of that information to labels.

In an embodiment, a method for increasing security in online transfers by maintaining anonymity of transferors comprises receiving, at a label tracking system, a request to generate labels for an account of an account holder; generating a plurality of labels for the account, wherein the plurality of labels includes a first label and a second label; sending the plurality of labels to an account computing device, wherein the account computing device stores a mapping of labels to identification information; receiving an allocation request for allocating a first portion of items in the account to the first label and for allocating a second portion of the items in the account to the second label; in response to the allocation request, storing label allocation data that indicates the first portion of items are allocated to the first label, and the second portion of items are allocated to the second label; receiving a request to transfer a third portion of items from the first label to the second label; without changing items in the account, and without receiving identification information corresponding to the first label or the second label, updating the label allocation data to: decrement the items allocated to the first label by the third portion, and increment the items allocated to the second label by the third portion.

In an embodiment, a method for utilize a separate system for tracking item allocations in a manner that increases security and maintains anonymity of transferors comprises storing one or more items in an account of an account holder; receiving a request to generate a plurality of subdivisions of the account, each of the plurality of subdivisions corresponding to identifying information; sending, to a label tracking system, a request to generate labels for the one or more items; receiving, from the label tracking system, a plurality of labels; generating and storing a mapping of the plurality of labels to the subdivisions corresponding to identifying information; receiving a request to allocate a first portion of the one or more items to a first subdivision and a second portion of the one or more items to a second subdivision; identifying a first label of the plurality of labels as corresponding to the first subdivision and a second label of the plurality of labels as corresponding to the second subdivision in the mapping; sending, to the label tracking system, allocation data allocating the first portion of the one or more items to the first label and a second portion of the one or more items to the second label; receiving a request to transfer a third portion of the one or more items from the first subdivision to the second subdivision; identifying the first label as corresponding to the first subdivision and the second label as corresponding to the second subdivision in the mapping; sending, to the label tracking system, a request to transfer the third portion of the one or more items from the first label to the second label.

System Overview

FIG. 1 depicts an example system on which example embodiments may be performed. In an embodiment, a first client computing device 110, a second client computing device 120, an account holder computing device 130, a label tracking system 140, and an external transfer system 150 communicate over network 100. Network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The first client computing device 110, second client computing device 120, account holder computing device 130, label tracking system 140, and external transfer system 150, and other elements of the system may each comprise an interface compatible with the network 100 and are programmed or configured to use standardized protocols for communication across the networks such as TCP/IP, Bluetooth, and higher-layer protocols such as HTTP, TLS, and the like.

Each of the first client computing device 110 and the second client computing device 120 is a computer that includes hardware capable of communicatively coupling the devices to one or more server computers, such as label tracking system 140 over one or more service providers. For example, sending the first client computing device 110 may include a network card that communicates with label tracking system 140 through a home or office wireless router (not illustrated in FIG. 1) coupled to an internet service provider. Each of the first client computing device 110 and the second client computing device 120 may be a smart phone, personal computer, tablet computing device, PDAs, laptop, or any other computing device capable of transmitting and receiving information and performing the functions described herein.

The account holder computing device 130, label tracking system 140, and externally transfer system 150 may be implemented using server-class computers or other computers having one or more processor cores, co-processors, or other computers. The account holder computing device 130, label tracking system 140, and/or external transfer system 150 may be physical server computers and/or virtual server instances stored in a data center, such as through cloud computing.

In an embodiment, the account holder computer device 130 comprises subdivision to label mapping 132, account data 134, and stored subdivision rules 136. Subdivision to label mapping 132 comprises a stored mapping between identified subdivisions, such as user identifiers or account subdivision identifiers, and labels created by the label tracking system 140. Account data 134 comprises stored information regarding a particular account, such as items stored in the account and any protected information required to generate the account, such as social security numbers, full names, account addresses, or other identifying information. The account holder computing device 130 may store a mapping and account data for each account. Stored subdivision rules 136 comprise a set of optionally stored rules relating to specific subdivisions, such as minimal balances and maximum expenditures.

In an embodiment, label tracking system 140 comprises label allocation data 142, transaction list 144, and a transaction request application programming interface (API) endpoint 146. The label allocation data 142 comprises one or more data records which indicate, for a specific account, a number of items that correspond to each of a plurality of generated labels. The transaction list 144 comprises a list of transactions between different labels and/or between labels and external accounts. The label tracking system 140 may be configured to manage and update label allocation data 142 and/or the transaction list 144 in response to receiving a query through the transaction request API endpoint 146 identifying one or more labels and allocation and/or transfer data.

External transfer system 150 comprises an entity separate from the account holder computing device and label tracking system which receives requests for performing transactions from one or more client computing devices and verifies transactions through the label tracking system 140 and/or the account holder computing device. For example, the external transfer system 150 may provide a transfer application to a client computing device through which the client computing device can initiate a transfer. The external transfer system may store data identifying one or more labels for the client computing device and/or an additional subdivision to label mapping, thereby allowing the external transfer system to initiate and complete transactions in a similar manner as the account holder computing device.

For purposes of illustrating a clear example, FIG. 1 shows a limited number of instances of certain functional elements. However, in other embodiments, there may be any number of such elements. For example, embodiments may use thousands or millions of different client computing devices associated with different users. Further, the account holder computing device 130 and label tracking system 140 may be implemented using two or more processors, cores, clusters, or instances of physical machines or virtual machines, configured in a discrete location or co-located with other elements in a datacenter, shared computing facility or cloud computing facility.

Label Storage

Figure 2:
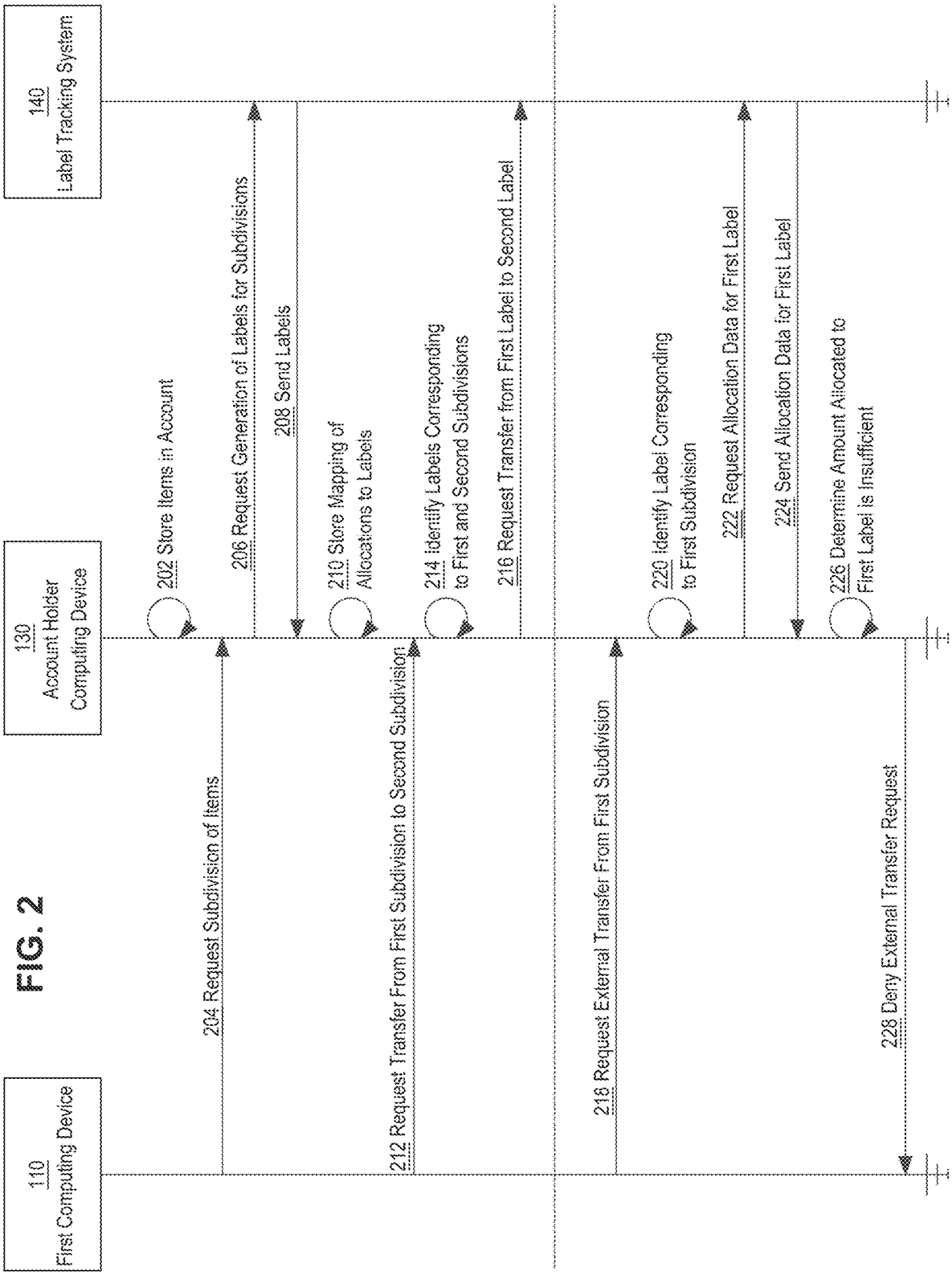
FIG. 2 depicts an example method for providing transfer facilitation.

FIG. 2 depicts an example method for providing transfer facilitation. The method of FIG. 2 allows security to be maintained during a transfer while providing extended transfer capabilities through a computing system.

At step 202, the account holder computing device 130 stores items in an account. The items may refer to any set of non-unique items, including physical items, such as goods or currency, and digital electronic items, such cryptocurrency or other virtual currency. In an embodiment, the account holder computing device stores the items on behalf of one or more other client computing devices. For example, items stored at the account holder computing device 130 may be owned by a user of the first client computing device 110 or the second client computing device 120.

At step 204, the account holder computing device 130 receives a request for a subdivision of the items stored in the account from the first client computing device 110. For example, the account holder computing device 130 may store the items in a particular account on behalf of a user of the first client computing device 110. The first client computing device 110 may send a request to the account holder computing device 130 to subdivide the account into a plurality of subdivisions.

In an embodiment, the plurality of subdivisions corresponds to a plurality of different people with different access rights and/or devices. For example, a first subdivision may be generated for an owner of the account while a second subdivision is generated for a relative of the owner of the account. Subdivisions may also correspond to different purposes, such as a necessities fund and a vacation fund.

In an embodiment, the subdivisions correspond to one or more rules. For example, a particular subdivision may correspond to a minimum balance rule which indicates a minimum amount of the item that must be stored in the first subdivision. Rules may also relate to who is allowed to access the subdivision, who is allowed to transfer to or from the subdivision, where funds from the subdivision may be spent, when funds from the subdivision may be spent, and/or any other rules relating to the balance and/or use of items in the subdivision.

At step 206, the account holder computing device 130 requests generation of labels for the subdivisions from the label tracking system 140. For example, the account holder computing device 130 may store data identifying each of the subdivisions. The account holder may send a request to the label tracking system 140 to generate a label for each of the subdivisions.

In an embodiment, the account holder computing device 130 does not identify the subdivisions to the label tracking system. For instance, instead of requesting subdivisions for four specific users, the account holder computing device 130 may send a request to the label tracking system which merely identifies an account and requests the generation of four labels for the account. Thus, the label tracking system 140 may not receive any data identifying the owner of the items or any of the uses of the subdivisions. In an embodiment, the account holder computing device 130 additionally requests a label for the account. Thus, when initially implementing the method, the account holder computing device 130 may request a label by which to identify the account. The account holder computing device 130 may then use the label to identify the account when requesting the plurality of subdivisions.

While embodiments are described whereby a first client computing device 110 requests labels from an account holder computing device 130, the methods described herein may bypass either the first client computing device 110 or the account holder computing device 130. For example, the account holder computing device may request the subdivisions from the label tracking system 140 without initially receiving a request from the first client computing device 110.

Additionally or alternatively, the first client computing device 110 may send a request directly to the label tracking system 140 for generation of a plurality of labels without sending the request to the account holder computing device 130. In this implementation, the account holder computing device 130 may perform external transactions, but without an awareness of the generated subdivisions or labels. The implementation which bypasses the account holder computing device 130 is described further herein.

At step 208, the label tracking system 140 generates a plurality of labels and sends the plurality of labels to the account holder computing device 130. For example, the label tracking system 140 may be programmed or configured to generate unique labels in response to a request from the account holder computing device 130 and/or a client computing device. The labels may each comprise a unique string of values which are used to identify the individual subdivisions. The label tracking system 140 may then send the generated labels to the account holder computing device 130.

At step 210, the account holder computing device stores a mapping of subdivisions to labels. For example, if the account holder computing device 130 received a request to generate three subdivisions for a particular account, one for the account owner, one for the account owner's spouse, and one for the account owner's child, the account holder computing device 130 may send a request to the label tracking system 140 to generate three labels. When the account holder computing device 130 receives the three unique labels from the label tracking system 140, the account holder computing device 130 may store data mapping a first label of the three labels to the account owner, a second label of the three labels to the owner's spouse, and a third label of the three labels to the owner's child.

In an embodiment, the request for generation of labels for the subdivisions includes allocation data indicating an amount of the items to assign to each label. For example, the account holder computing device 130 may request generation of two labels for an account, an assignment of $10,000 to a first label of the two labels, and an assignment of $20,000 to a second label of the two labels. The label tracking system 140 may generate the two labels, store data indicating an assignment of $10,000 to one label and $20,000 to the other label, and send the two labels to the account holder computing device 130 with data indicating which label has which assignment. Additionally or alternatively, the account holder computing device 130 may initially request labels without sending allocation information. After the account holder computing device 130 stores the mapping of subdivisions to labels, the account holder computing device 130 may send allocation data to the label tracking system 140 identifying allocations of the items to each of the unique labels. The label tracking system 140 may then store the allocation data indicating the allocations of the items to each of the unique labels.

In an embodiment, the allocation data may allocate less than all of the items in the account and/or more than all of the items in the account. For example, if an account comprises $500,000, the allocation data may allocate only a total of $100,000 and leave the remainder unallocated. As another example, if the account comprises $500,000, the allocation data may allocate $300,000 to a first label and $300,000 to a second label, thereby exceeding a total allocation of $500,000. Such allocations may be useful in allowing multiple users, items, or uses to access the same funds.

The systems and methods described herein improve storage and transfer of items. In the embodiment described in steps 202-210, a set of labels and allocations for the labels are stored at the label tracking system 140 while the account information and mapping of labels to identifiers is stored at the account holder computing device 130. Thus, the label tracking system 140 is able to track transactions between labels while being agnostic as to the source or meanings of the individual labels. Meanwhile, any transfers between labels can be performed by devices authorized to perform transfers which store the mapping of labels to identifiers.

In an embodiment, a client computing device may bypass the account holder computing device 130 and communicate directly with the label tracking system 140. Thus, a client computing device may request the generation of labels from the label tracking system 140 and allocate items stored by the account holder computing device 130 without identifying the subdivisions to the account holder computing device. The client computing device may then store a mapping of the subdivisions to the labels. By allowing allocations or labels to be managed by the client computing device, the account holder computing device 130 can remain agnostic regarding the existence or use of the labels. Thus, private information can be further protected by reducing the number of participants which receive data regarding the account or the subdivisions.

Label Transfers

Referring again to FIG. 2, at step 212, the first client computing device 110 requests a transfer from a first subdivision to a second subdivision from the account holder computing device 130. For example, the first client computing device 110 may send a request to the account holder computing device 130 requesting a transfer from one of the subdivisions to another subdivision. Thus, if a first subdivision corresponds to an account owner and a second subdivision corresponds to a child of the account owner, the account owner may use the client computing device to request a transfer of $500 from the account owner's subdivision to the child's subdivision.

At step 214, the account holder computing device identifies labels corresponding to the first and second subdivisions. The account holder computing device 130 may use the mappings of subdivisions to labels to identify the labels for the requested transfer. For example, in response to receiving a request to perform a transfer of $500 from an account owner's subdivision to a child's subdivision, the account holder computing device 130 may search through the mapping of subdivisions to labels for the account owner's subdivision and the child's subdivision.

At step 216, the account holder computing device 130 requests a transfer from the first label to the second label from the label tracking system 140. The label tracking system 140 may then update the allocation data by decrementing the amount allocated to the first label by the transfer amount and incrementing the amount allocated to the second label by the transfer amount. For example, the account holder computing device 130 may identify label A as corresponding to the account owner's subdivision and label B as corresponding to the child's subdivision. The account holder computing device 130 may send a request to label tracking system 140 that identifies label A as the transferor, label B as the transferee, and 500 as the transfer amount. The label tracking system 140 may then update the allocation data by decrementing label A by 500 and incrementing label B by 500.

In an embodiment, the label tracking system 140 stores a transaction list identifying each requested allocation and/or transfer. When the label tracking system 140 receives a request to transfer a particular number of items between a first label and a second label, the label tracking system 140 may append the transaction to the transaction list. As an example, the label tracking system may add a transaction to the end of the transaction list that indicates a transfer of 500 from label A to label B. The label tracking system 140 may then update the balances corresponding to label A and label B as described above.

In an embodiment, inter-account transfers may bypass the account holder computing device 130 or the client computing device. For example, the account holder computing device 130 may request a transfer between labels without receiving a request from an external source, such as in the case of automated transfers or in cases where the account holder computing device In an embodiment, inter-account transfers can be performed without a request being sent to the account holder computing device 130. For example, a client computing device may store a mapping of subdivisions to labels. When the client computing device receives input specifying a transfer between subdivisions, the client computing device may identify the corresponding labels and send a request to transfer between labels to the label tracking system 140. In this embodiment, the account holder computing device 130 which manages the account may remain ignorant as to transactions between labels. Thus, despite storing data relating to the account, the account holder computing device 130 may not be given information as to how the subdivisions of the account are managed.

External Transfers

The labels, as described herein, may be used to limit external transfers when the account holder computing device 130 is capable of performing the external transfer. This allows limits to be placed on subdivision usages of items stored in the account managed by the account holder computing device 130.

Referring again to FIG. 2, at step 218, the first client computing device 110 requests an external transfer from the first subdivision. For example, the first client computing device 110 may send a request to the account holder computing device which identifies a subdivision and an amount to transfer from the subdivision to an external account. While the request is shown as originating from the first client computing device 110, in other embodiments the request may be received from a third-party computing system. For example, a debit card company may issue a credit card for a particular subdivision. When the debit card is used to initiate a retail transaction, a retail computing device and/or a debit card company computing device may issue a request to the account holder computing device 130 to perform the external transfer. Additionally or alternatively, if the account holder computing device 130 issues the debit card, the account holder computing device 130 may receive the request from a retail computing device when the debit card is used for a transaction.

At step 220, the account holder computing device 130 identifies a label corresponding to the first subdivision. For example, the account holder computing device 130 may identify the first subdivision and a mapped first label in the subdivision to label mapping.

At step 222, the account holder computing device 130 requests allocation data for the first label. For example, the account holder computing device 130 may send a request to the label tracking system 140 for data identifying an amount of the item currently allocated to the first label. In an embodiment, the account holder computing device 130 initially determines whether the account has enough of the item to initiate the transaction. For example, if the transaction request is for an external transfer of $1,000 and the account only holds $500, the account holder computing device 130 may deny the transaction without requesting the allocation data from the label tracking system 140.

At step 224, the label tracking system sends allocation for the first label to the account holder computing device. For example, the label tracking system may identify the first label in the stored allocation data as well as an amount allocated to the first label. The label tracking system may respond to the request for allocation data with the identified amount allocated to the first label.

At step 226, the account holder computing device 130 determines whether the amount allocated to the first label is sufficient for the transaction. For example, the account holder computing device 130 may determine whether the amount allocated to the first label is greater than the amount requested to be transferred. In the scenario depicted in step 226, the account holder computing device 130 determines that the amount allocated to the first label is insufficient for the external transfer and, in response, at step 228, the account holder computing device 130 denies the external transfer request.

If at step 226, the account holder computing device 130 had determined that the amount allocated to the first label was sufficient for the transaction, the account holder computing device 130 may initiate the external transfer. After the external transfer has been completed, the account holder computing device 130 may send data to the label tracking system 140 indicating that a particular amount was transferred out of the first label. The label tracking system 140 may update stored allocation data by decrementing the amount allocated to the first label and/or by decrementing the amount allocated to the first account by the amount of the transfer request.

In an alternative embodiment, the request for an external transfer may initially bypass the account holder computing device. For example, an external computing device, such as a debit card issuer, may receive a request to perform a transfer from a subdivision of an account stored by the account holder computing device 130. The external computing device may identify a label corresponding to the subdivision and request label allocation information from the label tracking system for the label. When the label tracking system 140 returns the amount allocated to the label, the external system may determine whether the amount allocated to the label exceeds the amount of the external transfer. If so, the external system may send a request to the account holder computing device 130 to initiate the external transfer and update the label tracking system once the external transfer has been confirmed. If not, the external system may deny the external transfer request.

Label Types

The systems and methods described herein may be utilized for different types of labels with different types of restrictions and/or uses. The labels discussed in this section provide a non-exclusive list of examples of label types and/or label uses.

In an embodiment, labels can be generated for the purpose of providing access to funds or items to those unable to create an account with the account holder computing device 130. For example, a label may be created as an emergency fund for a child who is not old enough to create a bank account. As another example, an account may be generated for the benefit of an animal that cannot have an account generated in the animal's own name or a type of machine as discussed further herein. Thus, the use of labels for people, animals, machines, or other entities unable to create or own accounts allows for separations of funds or other items between said entities without relying on the structure of an account.

In an embodiment, labels may be generated in concurrence with specific rules for the labels. For example, a label may be generated with a minimum balance rule which restricts external transfers to those which would not reduce the label beyond the minimum balance. As another example, a label may be generated with a maximum transfer rule indicating a maximum amount that can be transferred in a single transaction, temporal rules such as restrictions on transfers based on a time or date, location rules such as restrictions on transfers based on location or location type, and/or any other type of restriction on the use or transfer of items which correspond to the label. The rules may be stored on the client computing device, at the account holder computing device, and/or at an external server computer.

Labels may also be used for sub-accounting of an account. For example, labels may be generated for different uses of funds, such as food purchases, vacation, gifts, necessities, bills, or other uses. The labels for different uses of funds may be associated with specific rules identifying when or where funds from the label can or must be used. For example, a stored rule may indicate that funds for purchases from a restaurant are to be removed from the food label. Additionally or alternatively, a stored rule for the food label may indicate that non-food purchases, such as purchases made for hardware, cannot be taken from the food label. Thus, the rules may enforce specific types of sub-accounting by either forcing external transfers to be allocated to a label or refusing external transfers for funds allocated to a label.

Stored rules may additionally determine allocation of funds that enter the account. For example, the account holder computing device 130 may store a rule that states that funds received from source A are applied to label B. When funds are added to the account from source A, the account holder computing device 130 may request allocation of those funds to label B at the label tracking system 140.

In an embodiment, labels may be limited to specific beneficiaries. The labels for specific beneficiaries may correspond to particular rules limiting external transfers from a label with can have rules limiting where a credit card can be used. For example, a label may be generated for the benefit of an animal, such as a dog. The label may correspond to a rule which specifies types of purchases that can be made using funds allocated to the label, such dog food, veterinary visits, grooming, dog toys, or other pet related expenditures. Additionally or alternatively, a restriction may be placed on locations at which expenditures may be made, such as at veterinary offices, dog groomers, or pet stores. Similar labels may be used for ensuring child support payments are used for the benefit of children or that funds donated to a business are allocated as requested by the donor.

In an embodiment, labels may be limited to specific machines, items, or other particular expenditure. For instance, systems may track costs associated with particular machines, such as cost of usage, cost of energy expenditure, rental costs, ingredient cost, gains from use of an appliance, or other operating/maintenance costs. As a practical example, a metered energy system may determine an amount of power used by a particular appliance and relate that amount of power to an energy cost. A label for an account may correspond to the particular appliance. A stored rule may indicate that all costs for the appliance are to be removed from the label corresponding to the particular appliance. Thus, when the appliance utilizes energy, the cost of energy utilization is either put aside for a later energy bill, an internal transfer is executed for the energy cost, and/or an external transfer is executed for the energy cost. Similarly, for an appliance rental where cost is determined based on use of the appliance, each use of the appliance may correspond to a particular label.

While labels have been generally described with respect to funds, labels may be utilized for any account storing a plurality of at least one type of non-unique item. For example, labels may refer to fake currency, such as video game currency or business specific currency, shares of a specific type of stock, or rights to an amount of physical goods, such as manufactured or grown items. An account may include multiple sets of non-unique items as well as labels for each. For example, a stock portfolio split between ten people may comprise 500 shares of stock A and 500 shares of stock B. The label tracking system 140 may store a set of labels for each of the ten people for stock A and a set of labels for each of the ten people for stock B. The label tracking system 140 may treat the two sets of labels as being from different accounts, thereby removing the possibility of comingling different types of non-unique items.

In an embodiment, data sent to the label tracking system 140 does not identify the type of item being transferred or allocated. For example, the account holder computing device may request generation of two labels and request allocations of 100 to each label without specifying whether the 100 is stock, currency, corn, or any other non-unique item. Thus, the label tracking system 140 may tracking transfers between labels and allocations of values to labels while being agnostic as to the type of item being transferred.

Figure 3:
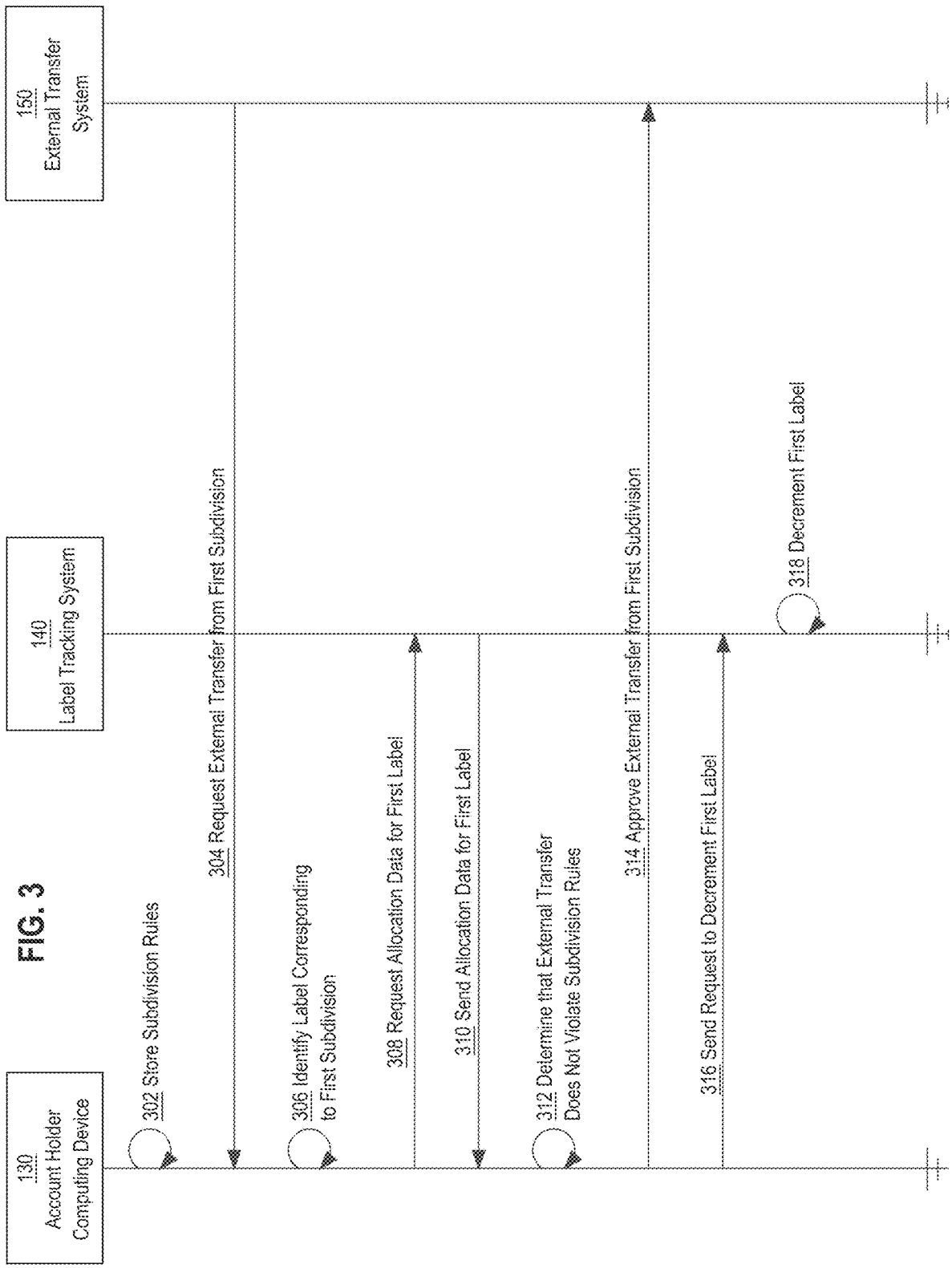
FIG. 3 depicts an example an example method for utilizing rules while providing transfer facilitation.

FIG. 3 depicts an example an example method for utilizing rules while providing transfer facilitation.

At step 302, an account holder computing device stores subdivision rules. The subdivision rules may be requested to be stored by a client computing device and/or an external system. For example, a graphical user interface executing on a client computing device may include options for specifying limitations on a subdivision. The account holder computing device 130, client computing device, or even an external system may store the subdivision rules. FIG. 3 depicts the account holder computing device 130 storing and implementing the subdivision rules for the purpose of providing a clear example.

At step 304, an external transfer system 150 requests an external transfer from a first subdivision. As discussed with respect to FIG. 2, the request may originate from a client computing device, the account holder computing device and/or an external transfer system. In the example of FIG. 3, an external transfer system which does not store the subdivision rules requests an external transfer from the first subdivision, such as in response to use of a debit card, machinery, or transfer request through an online application.

At step 306, the account holder computing device identifies a label corresponding to the first subdivision, such as described herein. For some rules, such as rules restricting the use of particular subdivisions, the account holder computing device may evaluate the rules based on the request prior to identifying a label for the subdivision. For example, if a rule restricts use of a subdivision to a particular retailer, the account holder computing device 130 may determine that the external transfer request was not made at the particular retailer and, in response, deny the transaction.

At step 308, the account holder computing device 130 requests allocation data for the first label, as described with respect to step 222 of FIG. 2. At step 310, the label tracking system 140 sends allocation data for the first label to the account holder computing device 130, as described with respect to step 224 of FIG. 2.

At step 312, the account holder computing device 130 determines whether the external transfer violates any subdivision rules. For example, if a rule for the first subdivision specifies that the first subdivision cannot have less that $50 dollars allocated to it, the account holder computing device 130 may determine whether the external transfer would leave the first subdivision with less than $50 dollars. If the account holder computing device 130 determines that the external transfer request violates one or more subdivision rules, the account holder computing device 130 may deny the transaction.

If the account holder computing device determines that the external transfer does not violate any subdivision rules, the account holder computing device 130 may send data to the external transfer system approving the external transfer. The external transfer system and/or the account holder computing device may initiate an external transfer from the stored account.

At step 314, the account holder computing device sends a request to the label tracking system to decrement the first label by the amount of the external transfer. At step 316, the label tracking system decrements an amount allocated to the first label by the amount of the external transfer. In an embodiment, the label tracking system 140 may also store transaction data identifying that an external transfer occurred from the first label for the decremented amount.

Multiple Label Transactions

In an embodiment, labels can be used to execute transactions without moving funds or items between accounts, thereby limiting both transaction time and difficulty in completing a transaction. For purposes of the example, the label tracking system may store labels for two different types of non-unique items, such as currency and stock. The labels may correspond to accounts stored by one or more account holder computing devices, the accounts being each split into a plurality of subdivisions corresponding to a plurality of different users.

For a multiple label transaction, the method of FIG. 2 may be performed with two sets of labels. For instance, if user A wishes to purchase 50 shares of a stock from user B for $500, a financial system may first identify labels for both user A and user B relating to an account holding currency while a stock system may identify labels for both user A and user B relating to stock. Both systems may request allocation data from the label tracking system 140 to determine whether user A can transfer $500 and whether user B can transfer 50 shares of the stock. If the systems determine that both transactions can occur, the systems may send a request to the label tracking system to decrement the currency label for user A by 500, increment the currency label for user B by 500, decrement the stock label for user B by 50, and increment the stock label for user A by 50. From the perspective of the label tracking system, a first label sent 500 to a second label and a third label sent 50 to a fourth label. Thus, the label tracking system is able to track allocations without knowledge of the purpose or type of transaction. In an embodiment, the financial system and the stock system are the same system.

Benefits of Certain Embodiments

The systems and methods described herein provide increased security for transactions made using computing systems over a network by maintaining anonymity of the transfer participants from the system storing the allocations while maintaining anonymity of account allocations from the holder of the account. By bifurcating the allocation data from the subdivision information, no single system can act as a single point of security fault. The account holder computing device can identify the subdivisions, but is unable to state the values associated with each subdivision. Meanwhile, the label tracking system is able to identify allocations without being able to state what is being allocated and what the stored labels correspond to. In some embodiments, a user is able to perform transfers while completely bypassing the account holder computing device. Thus, the management of the account may remain the same while transfers are performed at the subdivision level through the label tracking system.

The systems and methods described herein additionally can be sued to eliminate transaction costs and reduce delays in transfers between sources while providing a rules-based system that can limit the usage of items stored in a subdivision. Thus, an account holder may be able to transfer funds a long distance between two subdivisions by changing the label allocations without needing to physically move the funds. This eliminates the cost of performing transactions across long distances and the delays in the transfer, as the receiving subdivision will have access to the funds in the time it takes the label tracking system to update the label values. The rules further allow for bifurcation of an account in a manner that restricts the usage of items transferred, thereby providing security to the transferor.

The systems and methods described herein provide a practical application of a funds transfer by bifurcating the storage of label allocations from the storage of subdivision to label mappings. Additionally, the systems and methods described herein provide a practical application by allowing funds transfers to be performed through label allocations at a separate system instead of exposing that data to the account manager. This practical application speeds up transfers, provides anonymity, and reduces a number of required accounts for separate purposes.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
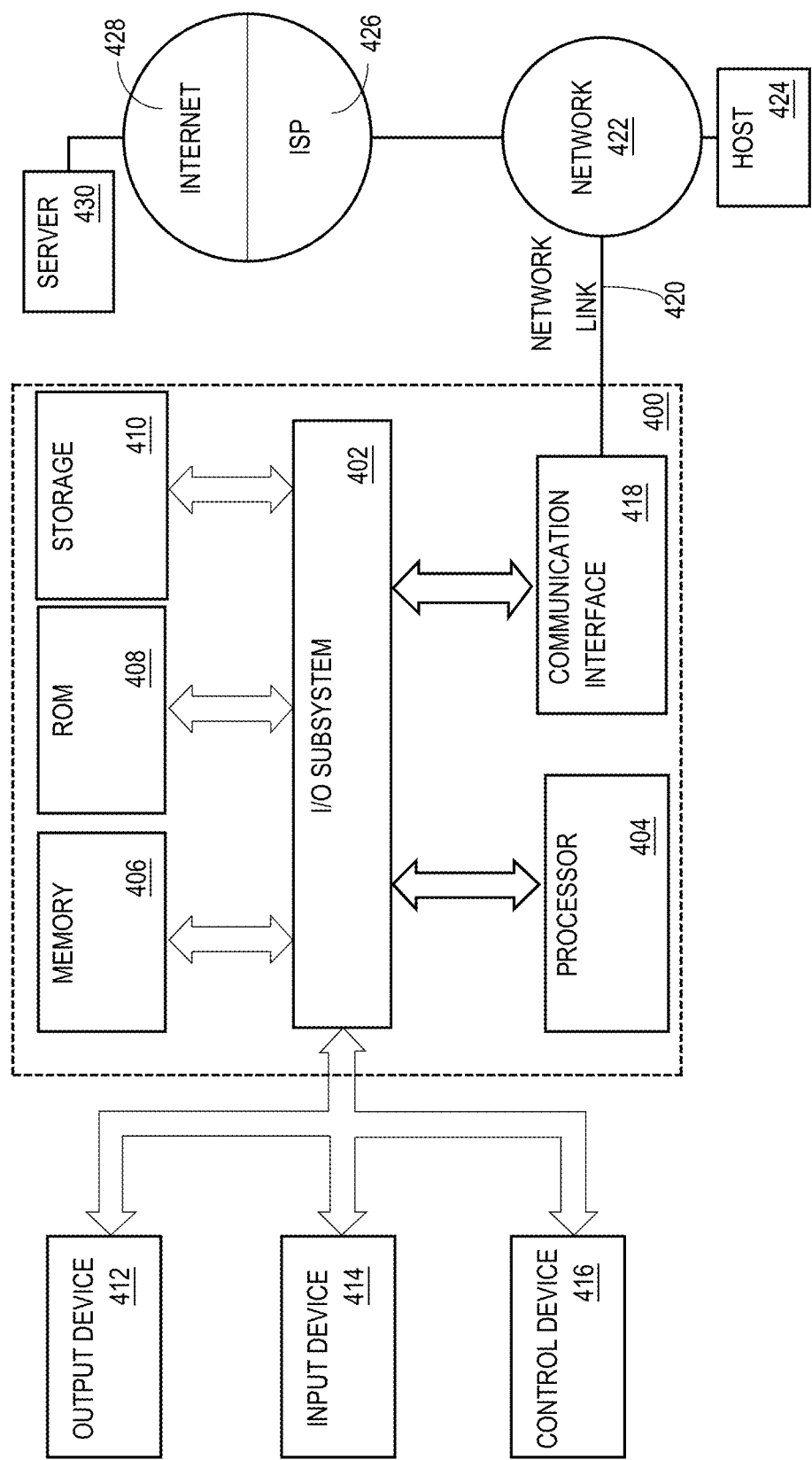
FIG. 4 is a block diagram that illustrates a computer system upon which an embodiment may be implemented.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method for increasing security in online transfers by bifurcating sensitive information between a label tracking system and a separate account computing device in a manner that restricts a usage of items to be transferred, the method comprising:

maintaining, at the label tracking system, first sensitive information that includes allocations of items to each label of a plurality of labels;

maintaining, at the account computing device, second sensitive information that includes subdivision information for a plurality of subdivisions of accounts maintained by the account computing device;

wherein the second sensitive information includes subdivision-specific information for each subdivision of the plurality of subdivisions;

maintaining, at the account computing device, a mapping of the plurality of labels to the plurality of subdivisions;

wherein the accounts maintained by the account computing device include a particular account that is associated with multiple subdivisions;

while the particular account stores one or more items, receiving a request to transfer a first portion of the one or more items from a first subdivision of the particular account;

based on the mapping, identifying a first label as corresponding to the first subdivision;

sending, to the label tracking system, a request for allocation data for the first label;

receiving allocation data for the first label from the label tracking system;

obtaining subdivision-specific rules for the first subdivision from the subdivision-specific information for the first subdivision;

based on the received allocation data and the subdivision-specific rules, determining that the request to transfer the first portion of the one or more items from the first subdivision would violate the subdivision-specific rules for the first subdivision and, in response, denying the request to transfer the first portion of the one or more items from the first subdivision.

2. The method of claim 1 further comprising:

displaying, on a client computing device, a graphical user interface for specifying the subdivision-specific rules for the first subdivision;

receiving, through use of the graphical user interface, the subdivision-specific rules for the first subdivision; and storing, at the account computing device, the subdivision-specific rules that were specified for the first subdivision.

3. The method of claim 1 further comprising:

receiving a second request to transfer a second portion of the one or more items from the first subdivision of the particular account;

based on the mapping, identifying the first label as corresponding to the first subdivision;

sending, to the label tracking system, a request for second allocation data for the first label;

in response to the request for second allocation data, receiving second allocation data for the first label from the label tracking system;

obtaining the subdivision-specific rules for the first subdivision from the subdivision-specific information for the first subdivision;

based on the received second allocation data and the subdivision-specific rules, determining that the request to transfer the second portion of the one or more items from the first subdivision would not violate the subdivision-specific rules for the first subdivision; and in response to determining that the second request to transfer the second portion of the one or more items from the first subdivision would not violate the subdivision-specific rules, allowing the second request to transfer the second portion of the one or more items from the first subdivision.

4. The method of claim 3 further comprising:

in response to allowing the second request, the account computing device sending to the label tracking system a decrement request to decrement an amount allocated to the first label; and in response to the decrement request, the label tracking system decrementing the amount allocated to the first label.

5. The method of claim 1 further comprising:

while the particular account stores the one or more items, receiving a second request to transfer a second portion of the one or more items from a second subdivision of the particular account;

based on the mapping, identifying a second label as corresponding to the second subdivision;

sending, to the label tracking system, a request for second allocation data for the second label;

receiving second allocation data for the second label from the label tracking system;

obtaining subdivision-specific rules for the second subdivision from the subdivision-specific information for the second subdivision;

wherein the subdivision-specific rules for the second subdivision are different from the subdivision-specific rules for the first subdivision;

based on the received second allocation data and the subdivision-specific rules for the second subdivision, determining that the request to transfer the second portion of the one or more items from the second subdivision would violate the subdivision-specific rules for the second subdivision and, in response, denying the request to transfer the second portion of the one or more items from the second subdivision.

6. The method of claim 1 wherein the subdivision-specific rules for the first subdivision include that an allocation for the first subdivision cannot fall below a specified threshold.

7. One or more non-transitory computer-readable media storing instructions for increasing security in online transfers by bifurcating sensitive information between a label tracking system and a separate account computing device in a manner that restricts a usage of items to be transferred, the instructions including instructions which, when executed by one or more processors, cause:

maintaining, at the label tracking system, first sensitive information that includes allocations of items to each label of a plurality of labels;

maintaining, at the account computing device, second sensitive information that includes subdivision information for a plurality of subdivisions of accounts maintained by the account computing device;

wherein the second sensitive information includes subdivision-specific information for each subdivision of the plurality of subdivisions;

maintaining, at the account computing device, a mapping of the plurality of labels to the plurality of subdivisions;

wherein the accounts maintained by the account computing device include a particular account that is associated with multiple subdivisions;

while the particular account stores one or more items, receiving a request to transfer a first portion of the one or more items from a first subdivision of the particular account;

based on the mapping, identifying a first label as corresponding to the first subdivision;

sending, to the label tracking system, a request for allocation data for the first label;

receiving allocation data for the first label from the label tracking system;

obtaining subdivision-specific rules for the first subdivision from the subdivision-specific information for the first subdivision;

based on the received allocation data and the subdivision-specific rules, determining that the request to transfer the first portion of the one or more items from the first subdivision would violate the subdivision-specific rules for the first subdivision and, in response, denying the request to transfer the first portion of the one or more items from the first subdivision.

8. The one or more non-transitory computer-readable media of claim 7 wherein the instructions include instructions for:
  displaying, on a client computing device, a graphical user interface for specifying the subdivision-specific rules for the first subdivision;
  receiving, through use of the graphical user interface, the subdivision-specific rules for the first subdivision; and
  storing, at the account computing device, the subdivision-specific rules that were specified for the first subdivision.

9. The one or more non-transitory computer-readable media of claim 7 wherein the instructions include instructions for:
  receiving a second request to transfer a second portion of the one or more items from the first subdivision of the particular account;
  based on the mapping, identifying the first label as corresponding to the first subdivision;
  sending, to the label tracking system, a request for second allocation data for the first label;
  in response to the request for second allocation data, receiving second allocation data for the first label from the label tracking system;
  obtaining the subdivision-specific rules for the first subdivision from the subdivision-specific information for the first subdivision;
  based on the received second allocation data and the subdivision-specific rules, determining that the request to transfer the second portion of the one or more items from the first subdivision would not violate the subdivision-specific rules for the first subdivision; and
  in response to determining that the second request to transfer the second portion of the one or more items from the first subdivision would not violate the subdivision-specific rules, allowing the second request to transfer the second portion of the one or more items from the first subdivision.

10. The one or more non-transitory computer-readable media of claim 9 wherein the instructions include instructions for:
  in response to allowing the second request, the account computing device sending to the label tracking system a decrement request to decrement an amount allocated to the first label; and
  in response to the decrement request, the label tracking system decrementing the amount allocated to the first label.

11. The one or more non-transitory computer-readable media of claim 7 wherein the instructions include instructions for:
  while the particular account stores the one or more items, receiving a second request to transfer a second portion of the one or more items from a second subdivision of the particular account;
  based on the mapping, identifying a second label as corresponding to the second subdivision;
  sending, to the label tracking system, a request for second allocation data for the second label;
  receiving second allocation data for the second label from the label tracking system;
  obtaining subdivision-specific rules for the second subdivision from the subdivision-specific information for the second subdivision;
  wherein the subdivision-specific rules for the second subdivision are different from the subdivision-specific rules for the first subdivision;
  based on the received second allocation data and the subdivision-specific rules for the second subdivision, determining that the request to transfer the second portion of the one or more items from the second subdivision would violate the subdivision-specific rules for the second subdivision and, in response, denying the request to transfer the second portion of the one or more items from the second subdivision.

12. The one or more non-transitory computer-readable media of claim 7 wherein the subdivision-specific rules for the first subdivision include that an allocation for the first subdivision cannot fall below a specified threshold.

* * * * *